United States Patent [19]
Tucholski

[11] Patent Number: 5,057,382
[45] Date of Patent: Oct. 15, 1991

[54] CIRCUIT INTERRUPTER FOR A GALVANIC CELL

[75] Inventor: Gary R. Tucholski, Parma Heights, Ohio

[73] Assignee: Eveready Battery Co., Inc., St. Louis, Mo.

[21] Appl. No.: 418,240

[22] Filed: Oct. 6, 1989

[51] Int. Cl.$^5$ ............................................. H01M 2/00
[52] U.S. Cl. .......................................... 429/61; 429/57
[58] Field of Search ....................... 429/61, 56, 57, 58, 429/59, 7, 121, 122, 53

[56] References Cited

U.S. PATENT DOCUMENTS

| | | | |
|---|---|---|---|
| 4,690,879 | 9/1987 | Huhndorff et al. | 429/61 |
| 4,756,983 | 7/1988 | Tucholski | 429/61 |
| 4,788,112 | 11/1988 | Kung | 429/54 |
| 4,818,641 | 4/1989 | Ledenican | 429/61 |
| 4,855,195 | 8/1989 | Georgopoulos et al. | 429/54 |

*Primary Examiner*—Anthony Skapars
*Attorney, Agent, or Firm*—Robert W. Welsh

[57] ABSTRACT

A galvanic cell with a circuit interrupter to protect the cell from excessive current flow. The circuit interrupter is mounted on one end of the metal container which holds the electrodes and electrolyte making up the galvanic cell. The metal container is in electrical contact with one of the electrodes. One part of the circuit interrupter is adhered to the end of the galvanic cell by a layer of adhesive. This part is also in contact with the container and forms an external terminal for the galvanic cell. The part can be of annular configuration and provide a central aperture for access to the other external terminal or to a port used to fill the galvanic cell with electrolyte. In operation, excessive electrical current will cause the end of the cell to bulge, breaking the electrical contact between the external terminal and the container, effectively electrically isolating the container from that external terminal.

34 Claims, 2 Drawing Sheets

CIRCUIT INTERRUPTER FOR A GALVANIC CELL

BACKGROUND OF THE INVENTION

In the use of galvanic cells, particularly alkaline cells, it is not uncommon for the cell to swell and/or leak electrolyte because of improper usage or prolonged storage. For example, if the cell is excessively charged, gas that is normally given off in the charging process can build up in the cell causing the cell to become distorted and if sufficient pressure builds up, the cell can rupture, spilling electrolyte. With high energy cells such as lithium/oxyhalide cells, when operated under certain extreme conditions, there is also the possible danger of cell disassembly and/or fire unless the cells are properly vented.

A cell can be inadvertently subjected to improper usage by the accidental misorientation of the cell in a multicell device. For example, a portable radio, tape player, or flashlight that employs several cells in order to obtain sufficient voltage for the operation of the device can be the site where a cell inadvertently could be added to the electronic device in an incorrect orientation. The cell would then be subjected to charging voltages which could cause it to bulge due to excessive gas pressure and to spill electrolyte in the electronic device. In order to protect the cells from improper charging, diodes have been added which would preclude a reverse potential from being applied to the cell. While a diode does work, it adds unnecessary complexity and expense to the cell. A switch for interrupting the flow of current and isolating the internal components of the galvanic cell is disclosed in U.S. Pat. No. 4,690,879 issued to Huhndorff et al., Sept. 1, 1987, and assigned to the assignee of the present invention. This patent discloses an external electrical contact for the galvanic cell which is adhered to the bottom of the central portion of the cell by a nonconductive adhesive. The perimeter of the contact is welded to the bottom of the cell. On expansion of the cell due to improper use, the bulging of the bottom of the cell will cause the welds to break, interrupting the flow of current and isolating the electrochemical components of the cell.

Another United States patent assigned to the assignee of the present invention is U.S. Pat. No. 4,756,983 issued to Tucholski on Jul. 12, 1988. This patent discloses a circuit interrupter having a central portion which is adhered to the center of the bottom of the galvanic cell by a nonconductive adhesive and a surrounding flange portion which is welded to the bottom of the cell. Expansion of the cell beyond a predetermined limit will cause the electrical connection between the central portion and the flange to break, electrically isolating the cell.

Both of the circuit interrupters disclosed in the aforementioned patents have been very useful in protecting galvanic cells. Both of the circuit interrupters are used across the continuous bottom portion of the container for the galvanic cell. Neither one of these circuit interrupters is suitable for use in a galvanic cell construction where both the positive and negative external terminals are exposed at the same end of the cell or in a situation where a filling port is provided on the bottom of the cell for adding electrolyte to the galvanic cell, the port then being closed with a suitable fill plug after the cell is full.

SUMMARY OF THE INVENTION

The present invention relates to an improved galvanic cell with an interrupter switch to protect the cell from excessive current flow such as can occur under high rate discharge conditions, short circuits, or inadvertent or excess charging. The cell construction is particularly suitable for a high energy lithium cell such as an oxyhalide cell. The circuit interrupter is positioned external to the container for the galvanic cell so as not to reduce the internal volume for active components. The improved circuit interrupter can be used in a galvanic cell construction where both external terminals for the cell are located at one end of the container. The circuit interrupter can also be used in a galvanic cell where one external terminal for the galvanic cell is located at one end of the container and at the opposite end, a fill port is provided for the cell electrolyte material The galvanic cell has a metal container with an open end and a closed end for holding the electrodes and the electrolyte for the cell. A cover with an aperture is provided for the end of the container. A closure is provided for the aperture in the cover. A layer of adhesive is applied to the outer face of the cover over a portion of the surface between the closure and the container. A secondary cover for the galvanic cell is then applied to the adhesive layer and is placed in electrical contact with the container making the secondary cover an external terminal for the cell. Excessive bulging of the container will then cause the secondary cover to break contact with the container, electrically isolating the secondary cover from the container of the galvanic cell. The cell is also provided with a safety vent. The circuit interrupter is designed to function at a predetermined internal pressure lower than that at which the safety vent will be activated. If after activation of the circuit interrupter, the internal pressure continues to rise, or if the rising cell pressure is due to other conditions such as thermal abuse, the safety vent will activate, thereby safely relieving the excessive internal pressure.

DETAILED DESCRIPTION OF THE PREFERRED EMBODIMENT

Figure 1:
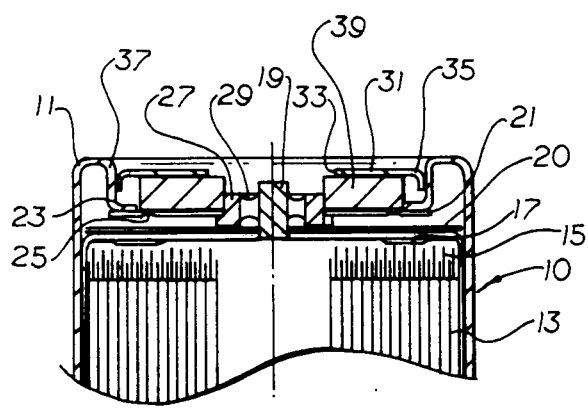
FIG. 1 is a partial sectional view of a galvanic cell and the circuit interrupter of the present invention.

In FIG. 1, there can be seen the galvanic cell indicated generally by the number 10. The lower portion of the cell is not shown as it would be of conventional construction. The cell of FIG. 1 has a container 11 in contact with one of the electrodes 13 of a jelly roll-type galvanic cell. The other electrode 15 of the cell 10 is connected to a conductive member 17, e.g., a metal disc, which in turn is connected to a contact or terminal pin 19, which forms an external electrical connection to the galvanic cell, the contact pin 19 being the external cathode terminal of the cell. An insulating washer 20 protects the member 17 from contact with the metal vent member 21. As mentioned previously, the galvanic cell with the circuit interrupter of the present invention is particularly useful with lithium/oxyhalide-type galvanic cells. Cells of this type employ lithium metal as one electrode material of the cell along with another electrode, usually carbon, (serving as the cathode collector) with an oxyhalide such as thionyl chloride, $SOC_{l_2}$, as the cathode-electrolyte. Additives can be added to the cell; however, the lithium and the thionyl chloride are the active electrode materials for the cell.

Figure 3:
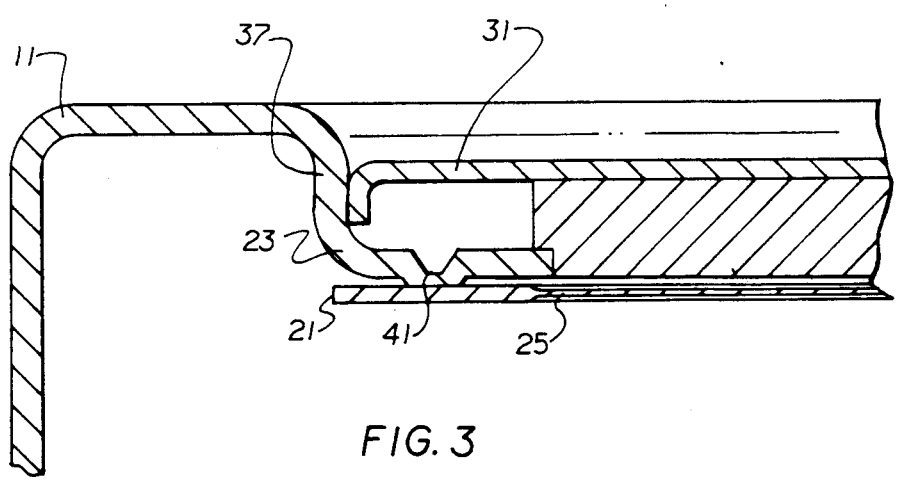
FIG. 3 is an enlarged partial sectional view of a cell showing in detail the junction between the cell container, the vent member and the secondary cover.

It is very important in lithium/oxyhalide galvanic cells to provide a vent to release any excessive internal pressure which may develop beyond the predetermined pressure at which the circuit interrupter activates. The vent member 21 is sealed to the lower edge 23 of the open end of container 11 at 41, as shown in FIG. 3. The vent member is thinned at 25, e.g., by etching and/or coining to reduce the thickness and in turn the strength of the vent member at this point to facilitate opening of the vent member as excessive pressure builds up within the cell. A suitable process for etching a vent member is taught in U.S. Pat. No. 4,803,136, issued Feb. 7, 1989, and assigned to Emerson Electric Company. On the inner edge of the vent member the inner flange 27 of a glass-to-metal or ceramic-to-metal seal is fastened. A layer of glass or ceramic material 29 supports the electrical contact pin 19 in electrical isolation from the vent member 21 and, in turn, the container 11.

One external terminal for the galvanic cell is provided by a one-piece secondary metal cover 31 which has an aperture 33 therein which provides access to the other external terminal 19. The peripheral edge portion 35 of the cover 31 is turned inwardly to provide a mating surface for the turned-in edge 37 of the container 11.

The cover 31 is attached to a layer of adhesive 39 which also adheres on its opposite side to the vent member 21.

When the disconnect device is utilized at the vented end of the cell, as in FIG. 1, care must be taken to prevent malfunction of the safety vent 21. It has been found that the use of a double-sided adhesive foam tape not only allows good fastening and insulation of the circuit interrupter, but also does not interfere with the operation of the safety vent. The following are examples of suitable tapes: 3M's #4032 (urethane foam, 1/32 inch thick) or Dubl-Kote foam tape, type A or E (1/32 inch thick, crosslinked polyolefin) from Duraco, Inc. of Chicago, Ill. The use of epoxies or other similar adhesives which cure to a rigid or semirigid state would not be suitable since these materials could interfere with the proper vent operation, consequently making the cell unsafe. A layer of flexible adhesive material, e.g., an elastomeric material, can be used, provided that the layer is thick enough to provide proper electrical insulation, yet thin enough to permit proper functioning of the safety vent.

Figure 2A:
FIG. 2a is an enlarged view of a portion of FIG. 2 showing the electrical isolation of one terminal of the galvanic cell by the circuit interrupter.
Figure 2:
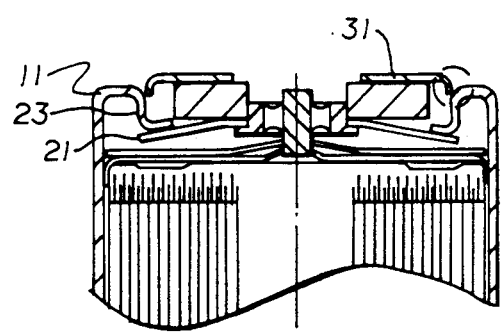
FIG. 2 is a partial sectional view of the cell of FIG. 1 illustrating the operation of the circuit interrupter.

The effect of increased-internal pressure within the galvanic cell container 11 can be seen in FIGS. 2 and 2a. At a predetermined internal pressure the vent member 21 bulges and the turned-in edge 23 of the container 11 bends upwardly causing the cover 31 to break electrical contact with the container 11, as in FIG. 2a, thereby electrically isolating one terminal of the electrochemical cell. The cover 31 breaks cleanly from the container 11 in a generally irreversible movement thus protecting the cell from electrical contact chatter. Once the circuit path has been broken, the galvanic cell should be continually electrically isolated from further current flow.

In order to facilitate the operation of the vent, the portion of the vent member 21, referring to FIG. 3, can be thinned at portion 25, e.g., by etching and/or coining to reduce the thickness of the metal and in turn the strength of the metal. The vent member 21 can then more easily rupture or tear thereby safely relieving excessive internal pressure.

Now referring to FIG. 4, where like parts will be given the same reference numbers as previously used, the circuit interrupter is shown recessed within one end of the container 11. A cup-shaped metal vent member 43 is shown which is press-fitted within the open end of the container 11. The vent member is attached to the container preferably by welding about the edges of the recessed cup and edge of the container at 45, although a suitable adhesive can also be used for this purpose. Like the vent member 21, the vent member 43 is thinned at portion 47 suitably by etching and/or coining. A ring contact member 49 provides electrical contact between the vent member 43 and secondary cover 53. The ring contact 49 is preferably welded at 51 to hold it in place. The secondary cover 53 consisting of a metal blank having an internal aperture 55 and an elongated turned-in peripheral edge portion 57 is in both mechanical and electrical contact with contact member 49. The secondary cover 53 is press-fitted into contact with ring contact 49 and is also held in position by a layer of double-sided adhesive foam tape 39 which is attached to the interior face of the secondary cover 53 and to the exterior face of the vent member 43.

Figure 4:
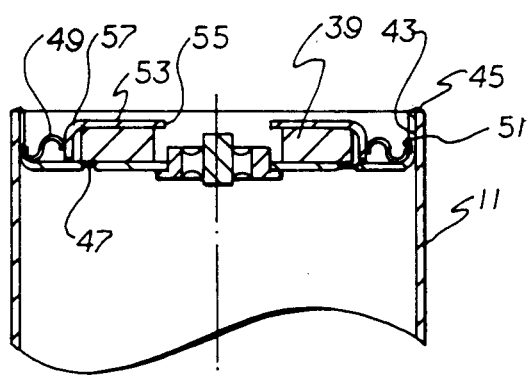
FIG. 4 is a partial sectional view of a cell showing the circuit interrupter recessed in the open end of the container of the galvanic cell.

In operation, at a predetermined internal pressure in the galvanic cell of FIG. 4, the vent member 43 will bulge outwardly causing double-sided adhesive layer 39 to move outwardly, pushing the secondary cover 53 away from electrical contact 49 thereby breaking the electrical contact to the galvanic cell and preventing additional current flow.

The galvanic cells of FIGS. 1 and 4 have used the circuit interrupter in a recessed position in one end of the container where both the positive and negative external terminals of the galvanic cell are located. In both of these galvanic cells, at least one terminal is located safely down below the edge of the container 11 and even further, one terminal has been positioned below the upper surface of the other terminal or secondary cover of the cell.

Figure 5:
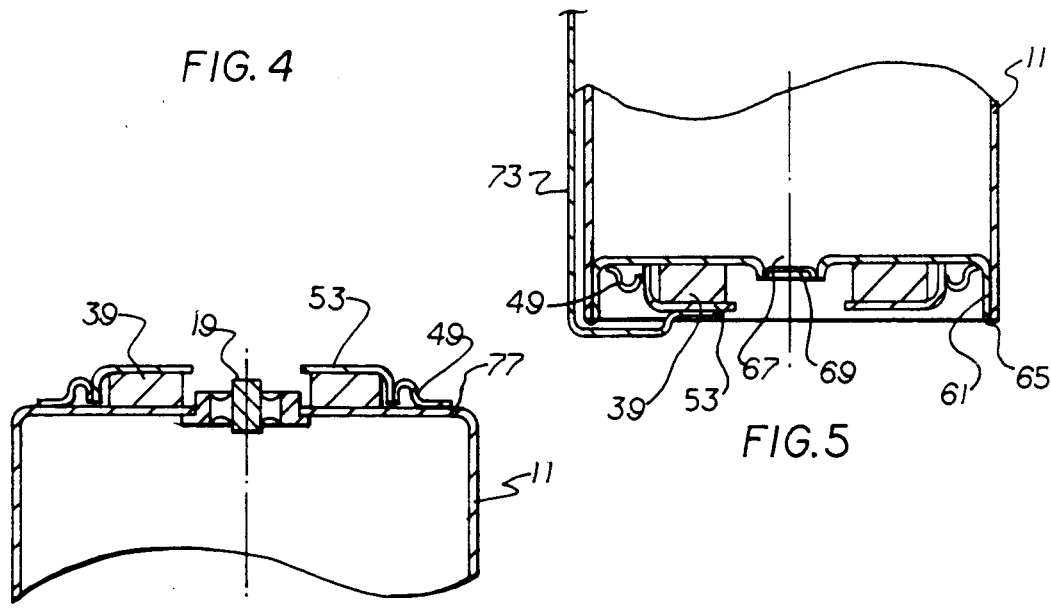
FIG. 5 is a partial sectional view of a cell showing the circuit interrupter positioned on the end of the cell where the liquid electrolyte can be added through a fill port.

A generally similar structure can be used as shown in FIG. 5. In this type of galvanic cell construction, one electrode terminal would be located at the opposite end of the cell (not shown). In the open end of the cell, a closure member 61 is press-fitted and recessed into the open end of the container 11. The closure member is preferably fastened to the container by welding at 65 where the edges of the recessed cup and the container meet or by the use of a suitable adhesive. In the center of the closure member 61 is located a port 67 through which electrolyte can be added to the galvanic cell after the electrodes have been assembled therein. The port is closed by a fill plug 69 and sealed, preferably by welding or an adhesive. A circular contact ring 49 is attached to closure member 61 preferably by welding. A layer of adhesive 39 adheres to the underside of the secondary cover 53 and to the outer surface of the closure member 61. A secondary cover 53 is press-fitted into mechanical and electrical contact with the ring 49. As in the previous discussion, the increase in internal pressure above a predetermined level in the galvanic cell will cause the closure member to bulge outwardly, pushing the secondary cover 53 away from the electrical contact ring 49 isolating the galvanic cell from further current flow. The secondary cover 53 forms the second external terminal of the galvanic cell. As shown in FIG. 5, for certain applications, an electrical conductor 73 can be attached to the cover 53 insulated from container 11 and used to connect the galvanic cell into a suitable electrical circuit.

Figure 6:
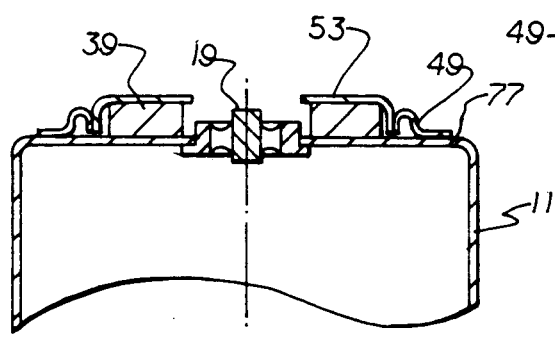
FIG. 6 is a partial sectional view of a cell showing the circuit interrupter in position on the closed end of the cell container.

In the already discussed embodiments, the circuit interrupter has been recessed into one end of the galvanic cell. The interrupter can also be in an exposed or outer position as shown in FIG. 6. In this figure, a container 11 has a nonvented end 77. The vent for the cell would be on the opposite end that is not shown. An electrical contact ring 49 is attached to the flat closed end portion of the container preferably by welding. A cover 53 is press-fitted into electrical and mechanical contact with the contact 49 and forms one external terminal for the galvanic cell. The other external terminal 19 is supported in a glass-to-metal or ceramic-to-metal seal similar to that discussed in relation to FIG. 1. The cover or external terminal 53 is supported in place by a layer of adhesive or double-sided adhesive foam tape 39 which is also adhered to the closed end 77 of the container 11. In operation, at a predetermined internal pressure in the galvanic cell, the closed end 77 of the container 11 will bulge, causing the cover 53 to rise and break contact with the ring contact 49, electrically isolating that terminal of the galvanic cell.

Figure 7:
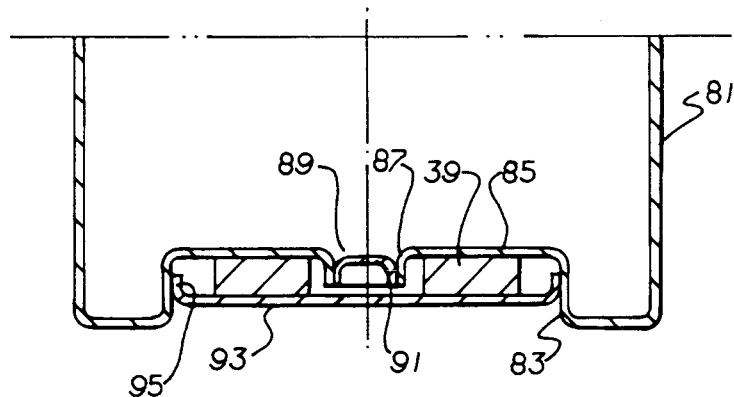
FIG. 7 shows a modification of the circuit interrupter used on the closed end of a galvanic cell where it covers the electrolyte fill port of the cell.

In all of the aforementioned embodiments, the secondary cover or external terminal for the galvanic cell has had an aperture therein for providing access either to one external terminal of the cell or a fill port. It is also within the scope of the present invention to use the circuit interrupter without an aperture where it completely covers the fill port and fill plug used to add electrolyte to the galvanic cell. Referring to FIG. 7, a container 81 is shown having a turned-in portion 83. The container end also has a flat central portion 85 and an outwardly directed portion 87. The portion 87 bounds an aperture 89 which forms the fill port for the galvanic cell. A fill plug 91 closes the fill port. A one-piece secondary cover 93 has a peripheral edge 95 which is press-fitted into contact with the surface portion 83 of the container 81. The secondary cover 93 is also supported by a layer of adhesive or double-sided adhesive tape or adhesive foam tape 39 which is attached to the flat portion 85 of the surface of the container 81. In this construction, the cover 93 again forms an external terminal for the galvanic cell. At a predetermined pressure within the container 81, the nonvented end portion 85 of the container will tend to bulge outwardly where the adhesive layer is located and will push the secondary cover 93 away from contact with the turned-in edge 83 of the container, breaking electrical contact to the galvanic cell and interrupting current flow. It should be pointed out that in the embodiment shown in FIGS. 6 and 7, the adhesive does not have to be flexible since the vent member is not in danger of being interfered with.

From the above discussion, it can be seen that an improved galvanic cell with a circuit interrupter has been disclosed which is particularly suitable for a lithium/oxyhalide cell. The galvanic cell is not limited to this type. It can also be, for example, an alkaline cell. The galvanic cell can also have other types of electrode assemblies other than the jelly roll-type as shown in FIGS. 1 and 2. For example, the galvanic cell can also be of the bobbin type.

Though the invention has been described with respect to a specific preferred embodiment thereof, many variations and modifications will become apparent to those skilled in the art. It is therefore the intention that the appended claims will be interpreted as broadly as possible in view of the prior art to include all such variations and modifications.

The embodiments of the invention in which an exclusive properly or privilege is claimed are defined as follows.

1. A galvanic cell with circuit interrupter comprising:
a metal container having a first end and a second end for containing the electrodes and electrolyte for said galvanic cell, said container being in electrical contact with one of the electrodes;
a cover for the first end of said container having an aperture therein;
a closure for the aperture in said cover;
a layer of adhesive on the exterior face of said cover, said layer covering a portion of the surface between said closure and said container; and
a secondary cover for said galvanic cell disposed on said layer of adhesive and in electrical contact with said container, whereby excessive bulging of said cover will cause said secondary cover to break electrical contact with said container thereby electrically isolating the secondary cover from the container of said galvanic cell.

2. A galvanic cell with a circuit interrupter as set forth in claim 1 wherein said cover provides a vent for said galvanic cell.

3. A galvanic cell with a circuit interrupter as set forth in claim 1 wherein said closure is a fill plug for said galvanic cell.

4. A galvanic cell with a circuit interrupter as set forth in claim 1 wherein said closure is a first external terminal for said galvanic cell supported by an insulating member in a metal ring which is fastened to said cover.

5. A galvanic cell with a circuit interrupter as set forth in claim 1 wherein said secondary cover is a second external terminal for said galvanic cell.

6. A galvanic cell with a circuit interrupter as set forth in claim 1 wherein the end of said container is turned into itself and provides a support for said cover and an electrical contact surface for said secondary cover.

7. A galvanic cell with a circuit interrupter as set forth in claim 1 wherein said secondary cover is held by said layer of adhesive and is press-fitted into said inwardly turned edge of said container.

8. A galvanic cell with a circuit interrupter as set forth in claim 1 wherein said cover is cup-shaped and is recessed into the open end of said container.

9. A galvanic cell with a circuit interrupter as set forth in claim 8 wherein the edge of said cup-shaped cover is welded to the edge of said container.

10. A galvanic cell with a circuit interrupter as set forth in claim 8 wherein an electrical contact ring is in electrical contact with the inner edge of said cup-shaped cover and with said secondary cover.

11. A galvanic cell with a circuit interrupter set forth in claim 1 wherein said secondary cover is of the same outer configuration as the inside of said container and has a turned-in peripheral edge.

12. A galvanic cell with a circuit interrupter as set forth in claim 10 wherein said electrical contact ring provides an electrical and mechanical contact between said turned-in peripheral edge on said secondary cover and said metal container.

13. A galvanic cell with a circuit interrupter as set forth in claim 1 wherein at least one of said first and second external terminals is recessed into said container.

14. A galvanic cell with a circuit interrupter as set forth in claim 1 wherein said layer of adhesive is a doublesided adhesive tape.

15. A galvanic cell with a circuit interrupter as set forth in claim 1 wherein said layer of adhesive is a doublesided adhesive foam tape.

16. A galvanic cell with a circuit interrupter as set forth in claim 1 wherein said layer of adhesive is a layer of flexible adhesive material.

17. A galvanic cell with a circuit interrupter as set forth in claim 1 wherein said layer of adhesive is a layer of elastomeric material.

18. A galvanic cell with a circuit interrupter comprising:
   a metal container for holding the electrodes and electrolyte for said galvanic cell, said container being in contact with one of the electrodes;
   a recessed end on said container having a turned-in edge portion surrounding a substantially flat portion having an aperture therein;
   a closure for said aperture in said recessed end on said container;
   a layer of adhesive covering a portion of said substantially flat portion of said recessed end between said aperture and said turned-in edge;
   an external terminal for said galvanic cell disposed on said layer of adhesive in electrical contact with said container, whereby excessive bulging of said recessed end of said container including said closure and said substantially flat portion will cause said external terminal to break electrical contact with said container thereby electrically isolating said container and said external terminal.

19. A circuit interrupter for a galvanic cell as set forth in claim 18 wherein said closure is an electrolyte fill plug for said galvanic cell.

20. A circuit interrupter for a galvanic cell as set forth in claim 18 wherein said external terminal is supported by said layer of adhesive and is press-fitted into contact with said turned-in edge portion of said recessed end on said container.

21. A circuit interrupter for a galvanic cell as set forth in claim 18 said external terminal is supported by said layer of adhesive below the edge of said recessed end on said container.

22. A circuit interrupter for a galvanic cell as set forth in claim 18 wherein said external terminal is a metal secondary cover of substantially the same configuration as the turned-in edge portion of said container and has a turned-in peripheral edge in press-fitted contact with said turned-in container edge.

23. A circuit interrupter for a galvanic cell as set forth in claim 18 wherein said layer of adhesive is a layer of double-sided adhesive tape.

24. A circuit interrupter for a galvanic cell as set forth in claim 18 wherein said layer of adhesive is a layer of double-sided adhesive foam tape.

25. A circuit interrupter for a galvanic cell as set forth in claim 18 wherein said layer of adhesive is a layer of elastomeric material.

26. A galvanic cell with a circuit interrupter comprising:
   a metal container having an open end and a closed end for containing the electrodes and electrolyte for said galvanic cell, said metal container being in contact with one of the electrodes;
   a vented cover for the open end of said container having an aperture therein;
   a first external terminal for said galvanic cell mounted in the aperture in said vented cover and electrically insulated from said vented cover;
   a first electrical contact disposed on and adjacent to the outer edge of said vented cover;
   a layer of adhesive on the exterior face of said vented cover, said layer covering a portion of the surface between said first external terminal and said first electrical contact;
   a second external terminal for said galvanic cell disposed on said layer of adhesive in contact with said first electrical contact;
   whereby excessive bulging of said vented cover will cause said second external terminal to break contact with said first electrical contact thereby electrically isolating said terminal and said contact.

27. A galvanic cell with a circuit interrupter as set forth in claim 26 wherein at least one of said first and second external electrode terminals is recessed into said container below the edge of said container.

28. A galvanic cell with a circuit interrupter as set forth in claim 26 wherein said first external terminal is recessed below said second external terminal.

29. A galvanic cell with a circuit interrupter as set forth in claim 26 wherein said vented cover is cup-shaped and recessed within said container.

30. A galvanic cell with a circuit interrupter as set forth in claim 26 wherein at least one of said first and second external terminals for said galvanic cell is positioned within said container and below the edge bounding the open end of said container.

31. A galvanic cell with a circuit interrupter as set forth in claim 26 wherein said first external terminal for said cell is supported in the aperture in said vented cover by an insulating seal assembly comprising a metal ring for attachment to said vented cover and a layer of insulating material joining said metal ring and said first external terminal.

32. A galvanic cell with a circuit interrupter as set forth in claim 26 wherein said second external terminal for said galvanic cell is an annular piece of metal with a turned-in edge for forming a press-fitted connection with said first electrical contact.

33. A galvanic cell with a circuit interrupter as set forth in claim 26 wherein said layer of adhesive is a layer of double-sided adhesive tape.

34. A galvanic cell with a circuit interrupter as set forth in claim 26 wherein said layer of adhesive is a layer of double-sided adhesive foam tape.

* * * * *